Jan. 7, 1958   R. F. WALDROP   2,819,358
SOCKET FOR ELECTRIC METERS
Filed March 15, 1956

INVENTOR.
Robert F. Waldrop
BY Thos. E. Scofield
ATTORNEY.

United States Patent Office 2,819,358
Patented Jan. 7, 1958

2,819,358

SOCKET FOR ELECTRIC METERS

Robert F. Waldrop, Johnson County, Kans., assignor to Milbank Manufacturing Co., Inc., Kokomo, Ind., a corporation of Indiana Application March 15, 1956, Serial No. 571,678

7 Claims. (Cl. 200—51.1)

This invention relates to electrical equipment and refers more particularly to an improved socket for use in connection with detachable electric meters.

A particularly important field of use for my invention is in connection with the installation of conventional detachable watt-hour meters in consumer wiring systems. As is known to those versed in the art, the large bulk of watt-hour meters in use today are of the detachable type. Meters of this type are self contained and are usually provided with projecting blade terminals which, when the meter is connected with the system, are received in spring jaw terminals carried by a suitable socket connected with the electrical system. The jaw terminals are respectively connected with the power lines and consumer load lines. Insertion of the meter in the socket completes the circuit and directs the current through the meter where the extent of use is measured in the known fashion.

One disadvantage which has previously been recognized in the simple meter socket arrangement is that the power supply to the consumer is shut off whenever the meter is detached for purposes of testing, repair or replacement. In many cases, for example, doctors' offices, hospitals, manufacturing plants utilizing special electrical equipment and others, this is highly undesirable. Even a momentary power failure can have disastrous results. Accordingly, there have been devised various ways of providing a by-pass between the socket terminals to close the circuit therebetween either prior to or at the time the meter is removed. The simplest of these involves the use of a portable by-pass which is connected with the terminals after removal of the meter. Another is to provide the socket with facilities which automatically close the circuit between the jaw terminals when for any reason the meter is withdrawn.

The present invention relates generally to sockets provided with automatic circuit closing facilities. A primary object of the invention is to provide improved apparatus for accomplishing the circuit closing in which the opening and closing of the circuit is made as fool-proof as possible and which by virtue of the simplicity thereof can be manufactured and assembled at a very low cost.

Another object of the invention is to provide a meter socket having automatic circuit closing means in which a jumper or conductor bar is provided between the jaw terminals, the bar being capable of displacement to break the contact between the jaw terminals when the meter is inserted in the socket and which automatically returns to the circuit closing position when the meter is removed. A feature of the invention in this respect is the providing of a jumper or conductor bar which by virtue of its location and manner of assembly with the jaw terminals can be provided with a size whereby it is capable of carrying extremely heavy current loads.

A further object of the invention is to provide a meter socket of the character described in which there is no possibility of the circuit closing mechanism sticking in an open position.

A special feature of the invention resides in taking advantage of the presence of the meter of the conventional blade terminal guards or protectors which extend alongside and are usually coterminous with the blade terminals. In my invention the guards, rather than the blades, are relied upon to mechanically operate the circuit closing mechanism thereby eliminating any undue mechanical stresses on the blade terminals.

Other objects and features of the invention together with the features of novelty appurtenant thereto will appear during the course of the following description.

In the accompanying drawing which forms a part of the specification and is to be read in conjunction therewith and in which like reference numerals indicate like parts in the various views.

Figure 1:
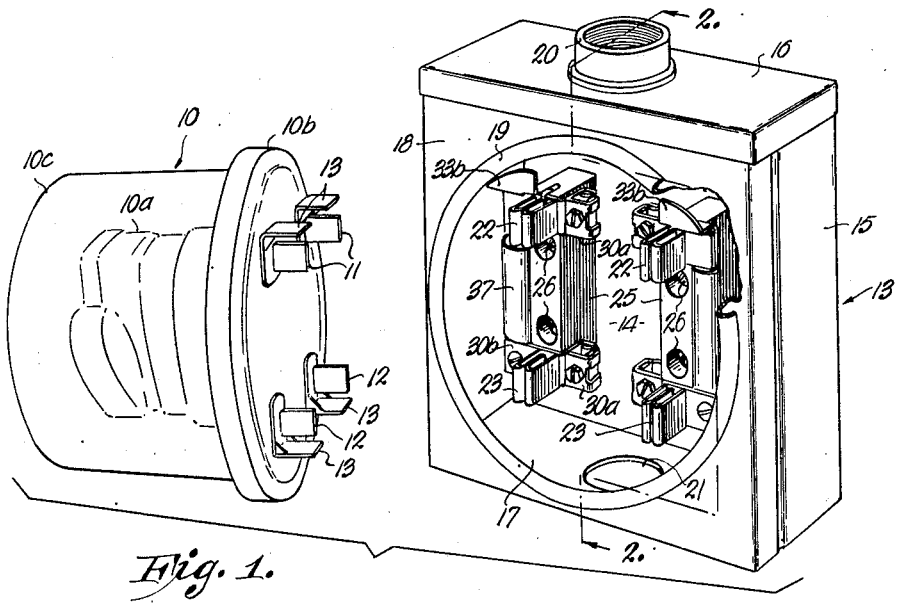
Fig. 1 is a front perspective view of a preferred embodiment of my invention, a typical electric meter being shown in conjunction therewith for purposes of illustration and the meter being shown detached from the socket.

Referring to the drawings, reference numeral 10 designates a typical electric meter of the detachable type, the particular meter illustrated being of the watt-hour type. So far as here pertinent, the meter includes an internal measuring mechanism 10a mounted on a base plate 10b and covered by a transparent cover 10c. Extending outwardly from the base plate are four blade terminals, the upper two being identified by reference numeral 11 and the lower two by reference numeral 12. Associated with each blade terminal is a rigid guard or protector element 13 which is fashioned from a nonconductive material. It will be noted that the elements 13 extend outwardly alongside the blade terminals and are substantially coterminous therewith. The terminals 11 and 12 on each side of the meter form the end terminals of a pair of circuits through the meter, the details of which form no part of the present invention.

A socket constructed according to my invention is designated generally at 13. As is believed clear from the drawing, the socket comprises a hollow preferably rectangular box having back wall 14, sides 15, top 16, bottom 17 and front panel 18. Front panel 18 is provided with an opening through which the blades 11 and 12 of the meter can enter the box, the margin of the opening being defined by the curled rim 19. The top 16 is provided with a conduit 20 extending therethrough and permitting insertion into the box of suitable electric lines. An opening 21 is provided in the bottom of the box for a similar purpose.

Located within the box are four spring jaw terminals consisting of two upper jaws 22 and two lower jaws 23. These jaws are of the conventional spring type having separable inwardly directed free flanges 24 (Fig. 3) which normally abut one another but which are spread apart when the blade terminals of the meter are inserted. The deformation of jaw flanges 24 during insertion of the blade terminals imposes a gripping force on the terminals which serves to hold the meter firmly in the socket.

The jaw terminals 22 and 23 are mounted in pairs on two substantially parallel insulating blocks 25 arranged vertically (as viewed in Figs. 1 and 2) within the box. To secure the blocks to the back wall of the box there are provided elongate screws 26 whose heads are recessed below the outer surface of the block and which extend through the block to threadedly engage suitable apertures in the back wall 14.

Figures 2, 3, 4:
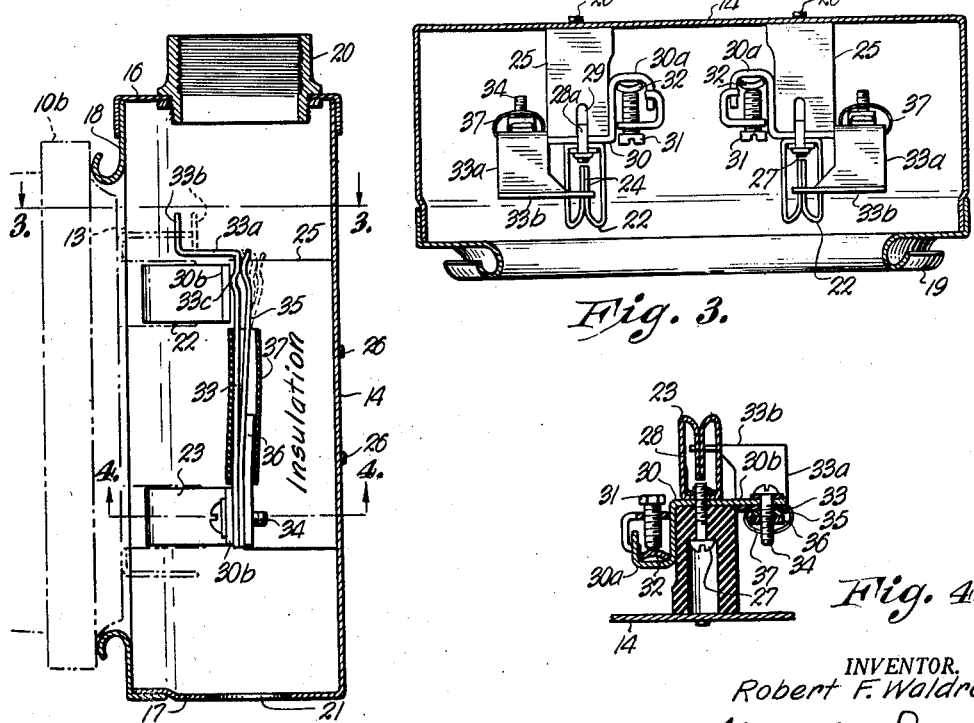
Fig. 2 is along the line 2—2 of Fig. 1 in the direction of the arrows.
Fig. 3 is a sectional view taken along the line 3—3 of Fig. 2 in the direction of the arrows.
Fig. 4 is a sectional view taken along the line 4—4 of Fig. 2 in the direction of the arrows.

The jaw terminals are secured to the respective blocks 25 by individual screws 27 which extend from inside each block (see Fig. 4) through suitable apertures therein and threadedly engage in each case a clamping plate 28 which lies on top of the base web of the jaw terminal. As is best seen in Fig. 3 the clamping plates are provided with prongs 28a bent over the ends of the blocks and toward the back of the box. These prongs are engaged in grooves 29 cut into the ends of the block and prevent any twisting of the jaw terminals relative the block.

Extending transversely across the outer surface of each block 25 and interposed between the base of each jaw terminal and the block is a specially formed member 30, one for each jaw. These members are provided in their center sections with apertures through which screws 27 extend, and are clamped to the block by the jaw terminals and screws. On one side of the block each member 30 is formed into a clamp terminal 30a having an adjustable screw 31 fitted with a pressure plate 32. The bus and load lines (not shown) can be connected into the clamp terminals at the opposite ends of the blocks. Members 30 are of course formed from an electrically conductive metal which will conduct the current to the jaw terminals associated therewith.

On the opposite sides of the blocks 25 from the clamp terminals 30a the members 30 provide laterally extending conductor arms 30b. Extending between the arms 30b on each block and substantially parallel to the block is a conductor plate or jumper 33, one for each block. One end of each conductor 33 is secured to one of the arms 30b by means of a screw 34. The other end of the conductor underlies the other arm 30b at the opposite end of the block and is provided with an outturned extension 33a which terminates in a flange 33b positioned alongside the adjacent jaw terminal. In the illustrated embodiment, I have shown the extensions 33a and flanges 33b as being positioned adjacent the upper jaw terminals 22. However, it will be evident that they can be reversed without affecting the operation of the unit.

Positioned beneath each conductor 33 and forming means for yieldably urging it into contact with the conductor arm 30b at its free end is a bowed leaf spring 35. Each spring is deformed to place it under constant internal tension by means of a bar member 36 which underlies the spring along a substantial portion of its length. The bar is provided with a threaded aperture through which extends the screw 34 and it will be evident that by means of the screw the bar can be tightened to clamp both the spring and conductor tightly to the arm 30b to which they are secured.

It will be noted that in the preferred embodiment of the invention each conductor 33 is provided adjacent the free end thereof with a dimple or ridge 33c which underlies the adjacent conductor arm 30b. The purpose of this ridge is to provide a better electrical contact between the conductor and the arm. It will also be noted that a sleeve 37 of nonconducting pliable material (for example, rubber) is fitted over each of the conductors 33 and their associated springs 35 and bars 36 to insulate these members from their surroundings. The sleeve covers the portions between the arms 30b, terminating at each end just short of the arms.

Returning now to the extension 33a and flange 33b on conductors 33, the dimensions of these elements relative to the meter are best shown in Fig. 2. The flange 33b on each conductor is so positioned as to lie in the path of the guard or protector element 13 affixed to the meter as earlier described. The extension 33a is given a length relative the guard such that when the meter is inserted to its full depth in the box with the blade terminals 12 fully in the jaw terminals 22 the end of the guard will engage flange 33b and depress the free end of conductor 33 to break the contact with the adjacent conductor arm 30b. The extent of movement of conductor 33 away from the arm should be a minimum of 1/8 inch so that sparking will be prevented. The flange 33b should be given a substantial area so that the box will accommodate meters of different manufacturers having different spacings of the guard elements from the blade terminals.

Care must also be taken to insure that the spring force of the spring 35 is somewhat less than the gripping force exerted by the jaw terminals 22 on the blade terminals 12 received therein. Unless this is done, there is danger that the springs 35 will operate to eject the meter blades from their jaws and thus short circuit the current past the meter.

The operation of the invention should be clear from the foregoing description. When the meter is connected with the socket (as illustrated in Fig. 3, the meter being shown in broken lines), the blade terminals 11 and 12 are received respectively in the jaw terminals 22 and 23 and a circuit is completed through the meter. By virtue of the engagement of the guards 13 with the extensions on conductors 31 the conductors are displaced and the contact points 33c on the respective conductors are separated from arms 30b. Thus the only complete circuit from each jaw terminal 22 to its associated jaw terminal 23 is through the meter.

Whenever, for any reason, the meter is detached from the socket the removal of the guards 13 permits the conductors to resume, under the influence of springs 35, the position illustrated in the solid lines in Fig. 2. The conductors 33 in this position conduct the current from the lower terminals to the upper terminals and thus there is no interruption in the current flow when the meter is removed. By virtue of making the extensions 33a on the conductors shorter than their adjacent jaw terminals, it is insured that contact through the conductor between the upper and lower terminals will be completed before complete withdrawal of the blade terminals of the meter from the jaw terminals in the socket.

From the foregoing it will be seen that my invention is one well adapted to attain all of the ends and object hereinabove set forth together with other advantages which are obvious and which are inherent to the structure. It will be noted that the assembly of parts at each jaw terminal is identical with all others. This simplifies to a considerable extent manufacture and assembly of the boxes and provides maximum interchangeability. Likewise, by providing the arms 30b extending to the sides of the mounting blocks 25, the dimensions of the conductor 33 can be altered as desired to accommodate any reasonable current load. Since there are no close fits between the movable parts and the stationary parts in the assembly there is no likelihood of accidental sticking or failure of the conductor to automatically close the by-pass circuits when the meter box is removed.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a socket for detachable electric meters of the type having at least two electrically connected blade terminals and provided with at least one rigid guard member located adjacent one of said blade members, a support, at least two spring jaw terminals mounted on said support in position to receive the blade terminals of the meter, means insulating said jaw terminals from said support, a spring biased conductor fixed at one end to one of said jaws, a contact on the other jaw, the other end of said conductor normally engaging said contact to close a circuit between said jaw terminals, and an extension on said conductor at said other end positioned in the path followed by said guard member on said meter as said blade terminals are inserted in said jaw terminals, said extension being constructed and arranged to be engaged by said guard to break the engagement between said conductor and said contact when said meter blade terminals are inserted into said jaw terminals.

2. In a socket for detachable electric meters of the type having at least two electrically connected blade terminals and provided with at least one rigid guard member located adjacent one of said blade members, a support, at least two spring jaw terminals mounted on said support in position to receive the blade terminals of the meter, means insulating said jaw terminals from said support, a spring biased conductor fixed at one end to one of said jaws, a contact on the other jaw, the other end of said conductor normally engaging said contact to close a circuit between said jaw terminals, and an extension on said conductor at said other end positioned in the path followed by said guard member on said meter as said blade terminals are inserted in said jaw terminals, said extension being constructed and arranged to be engaged by said guard to break the engagement between said conductor and said contact when said meter blade terminals are inserted into said jaw terminals, the gripping force of the jaw terminals on the blades being greater than the spring force acting on the conductor so that the meter blade terminals will be retained by the jaw terminals after insertion therein.

3. In a socket for detachable electric meters of the type having at least two electrically connected blade terminals and provided with at least one rigid guard member located adjacent one of said blade terminals comprising a support, an elongate insulating block secured to said support, a pair of jaw terminals secured to said block and spaced lengthwise of the block from one another according to the spacing of the blade terminals on the meter, said jaw terminals adapted to receive therein the meter blade terminals, conductor arms extending from said jaw terminals to one side of said block, a conductor bar extending parallel to said block and affixed at one end to one of said arms and underlying at its free end the other of said arms, spring means engaging said conductor bar to normally maintain it in contact with said other arm, and an extension on said conductor bar at its free end positioned in the path followed by said guard member on said meter as said blade terminals are inserted in said jaw terminals, said extension being constructed and arranged to be engaged by said guard member to cause depression of the free end of the conductor bar thereby to break the contact with said other arm when said meter blade terminals are inserted into said jaw terminals.

4. A socket as in claim 3 wherein the extension is so located as to cause contact to be made between said conductor and said other arm prior to the breaking of contact between the blade terminals and jaw terminals during detachment of the blade terminals from the jaw terminals.

5. A socket as in claim 3 wherein said spring means comprises a leaf spring affixed at one end to said one arm and underlying said conductor.

6. A socket as in claim 3 including a sleeve of electrical insulating material substantially covering that portion of the conductor between the two arms.

7. In a socket for detachable electric meters of the type having at least two electrically connected blade terminals and provided with at least one rigid guard member positioned adjacent one of said terminals and substantially coterminous therewith, a support, an elongate insulating block secured to said support, a pair of jaw terminals secured to said block and extending outwardly therefrom and spaced lengthwise of the block from one another according to the spacing of the blade terminals in the meter, said jaw terminals adapted to receive the blade terminals, a conductor arm extending laterally from the base of each jaw terminal to one side of said block, a conductor bar extending parallel to said block and affixed at one end to one of said arms, the conductor extending at its other end beneath the other of said arms and having an extension bent outwardly parallel to the adjacent jaw terminal and terminating in a flange generally transverse to the jaw terminal, yieldable means tending to maintain contact between said other end of said conductor and said other arm to provide a closed circuit through the conductor between said jaw terminals, said flange being so positioned as to lie in the path of said guard member on the electric meter and having a length such that when the blade terminal adjacent said guard is inserted in the adjacent jaw terminal, the guard will depress the conductor and break the contact between the conductor and said other arm.

References Cited in the file of this patent

UNITED STATES PATENTS

| 2,192,826 | Cole | Mar. 5, 1940 |
| 2,747,049 | Johansson | May 22, 1956 |
| 2,747,050 | Johansson | May 22, 1956 |